(12) United States Patent
Qu et al.

(10) Patent No.: US 10,117,189 B2
(45) Date of Patent: Oct. 30, 2018

(54) UPLINK POWER CONTROL METHOD, USER EQUIPMENT, AND BASE STATION

(71) Applicant: HUAWEI TECHNOLOGIES CO., LTD., Shenzhen (CN)

(72) Inventors: Bingyu Qu, Beijing (CN); Chuanfeng He, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 83 days.

(21) Appl. No.: 15/274,554

(22) Filed: Sep. 23, 2016

(65) Prior Publication Data

US 2017/0013566 A1    Jan. 12, 2017

Related U.S. Application Data

(63) Continuation of application No. PCT/CN2014/073941, filed on Mar. 24, 2014.

(51) Int. Cl.
*H04W 52/14* (2009.01)
*H04W 76/27* (2018.01)
(Continued)

(52) U.S. Cl.
CPC ....... *H04W 52/146* (2013.01); *H04W 52/365* (2013.01); *H04W 72/042* (2013.01);
(Continued)

(58) Field of Classification Search
None
See application file for complete search history.

(56) References Cited

U.S. PATENT DOCUMENTS

2010/0272091 A1  10/2010 Fabien et al.
2012/0044882 A1   2/2012 Kim et al.
(Continued)

FOREIGN PATENT DOCUMENTS

CN    102439895       5/2012
CN    102870457 A     1/2013
(Continued)

OTHER PUBLICATIONS

International Search report dated Dec. 22, 2014 in corresponding International Application No. PCT/CN2014/073941.
(Continued)

*Primary Examiner* — Hong Cho
(74) *Attorney, Agent, or Firm* — Staas & Halsey LLP

(57) ABSTRACT

The present invention provides an uplink power control method, user equipment, and a base station. The user equipment includes: a receiver, configured to receive first radio resource control protocol RRC configuration information sent by a first base station, where the first RRC configuration information includes a parameter used to calculate a power headroom PH that is of the UE and that is in a first cell controlled by the first base station; and a transmitter, configured to send second RRC configuration information to a second base station. The user equipment provided in the embodiments of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

14 Claims, 3 Drawing Sheets

---

UE receives first RRC configuration information sent by a first base station, where the first RRC configuration information includes a parameter used to calculate a PH that is of the UE and that is in a first cell controlled by the first base station — S101

The UE sends second RRC configuration information to a second base station, where the second RRC configuration information includes the parameter used to calculate the PH that is of the UE and that is in the first cell — S102

(51) Int. Cl.
*H04W 72/04* (2009.01)
*H04W 52/36* (2009.01)
*H04L 5/14* (2006.01)

(52) U.S. Cl.
CPC ... *H04W 72/0413* (2013.01); *H04W 72/0446* (2013.01); *H04W 76/27* (2018.02); *H04L 5/14* (2013.01)

(56) References Cited

U.S. PATENT DOCUMENTS

| | | | | |
|---|---|---|---|---|
| 2013/0089062 A1* | 4/2013 | Ahn | | H04W 52/365 |
| | | | | 370/329 |
| 2013/0094450 A1* | 4/2013 | Umesh | | H04W 52/242 |
| | | | | 370/329 |
| 2013/0121264 A1* | 5/2013 | Heo | | H04W 52/346 |
| | | | | 370/329 |
| 2013/0176953 A1* | 7/2013 | Stern-Berkowitz | | |
| | | | | H04W 52/146 |
| | | | | 370/329 |
| 2014/0056278 A1 | 2/2014 | Marinier et al. | | |

FOREIGN PATENT DOCUMENTS

| | | |
|---|---|---|
| CN | 103069870 A | 4/2013 |
| WO | WO2012138089 | 10/2012 |

OTHER PUBLICATIONS

International Search Report, dated Dec. 22, 2014, in International Application No. PCT/CN2014/073941 (4 pp.).
Extended European Search Report, dated Feb. 2, 2017, in European Application No. 14886731.0 (9 pp.).
*Power headroom report for dual connectivity*, 3GPP TSG RAN WG2 #85, Feb. 10-14, 2014, Prague, Czech Republic, R2-140328, pp. 1-4.
*Power control on dual connectivity*, 3GPP TSG RAN WG1 Meeting #76, Prague, Czech Republic, Feb. 10-14, 2014, R1-140762 (2 pp.).
*UL power control aspects of dual connectivity*, 3GPP TSG-RAN WG1 Meeting #76, Prague, Czech Republic, Feb. 10-14, 2014, R1-140561 (3 pp.).
Office Action, dated Aug. 3, 2018, in Chinese Application No. 201480001736.9 (9 pp.).

* cited by examiner

UPLINK POWER CONTROL METHOD, USER EQUIPMENT, AND BASE STATION

CROSS-REFERENCE TO RELATED APPLICATIONS

This application is a continuation of International Application No. PCT/CN2014/073941, filed on Mar. 24, 2014, the disclosure of which is hereby incorporated by reference in its entirety.

TECHNICAL FIELD

The present invention relates to the communications technologies, and in particular, to an uplink power control method, user equipment, and a base station.

BACKGROUND

A carrier aggregation (CA) technology is introduced in a Long Term Evolution Advanced (LTE-A) system, and two or more component carriers (CC) may be aggregated to support a larger bandwidth. Before the release R12 of LTE-A, the CA technology supports only carrier aggregation between carriers of a same duplex mode, but in the release R12, aggregation between carriers of different duplex modes are allowed. CA defined herein is based on an assumption of ideal backhaul, that is, a very short delay exists in backhaul between different network devices that control CCs or between different units of a same network device, and information can be exchanged quickly. For example, for CA between cells that are of different carriers and that belong to a same evolved Node B (eNodeB), because these cells belong to the same eNodeB, backhaul between the cells is ideal, and information can be exchanged quickly.

In the LTE-A R12 standard, a dual connectivity (Dual Connectivity, DC for short below) technology is introduced, user equipment (UE) may be simultaneously connected to two cells, so that the cells provide a service to the user equipment, where the two cells belong to different eNodeBs, and the eNodeBs are connected by means of non-ideal backhaul. A schematic diagram of dual connectivity is shown in FIG. 1, where carriers CC1 and CC2 are used in a macro cell and a small cell respectively, a duplex mode of the CC1 is frequency division duplex (FDD), and a duplex mode of the CC2 is time division duplex (TDD). The macro cell is controlled by a master eNodeB (MeNodeB), and the small cell is controlled by a secondary eNodeB (SeNodeB). The MeNodeB and the SeNodeB are connected by means of non-ideal backhaul, and consequently, a delay of exchange between the eNodeBs is relatively long.

When uplink transmission of UE is separately scheduled in two cells of dual connectivity, because of non-ideal backhaul, configuration information of one cell cannot be notified to the other cell in time; therefore, uplink scheduling of the UE in the two cells is relatively independent. For example, cells controlled by different eNodeBs cannot acquire a power headroom (PH) that is of another cell and that is reported by the UE. Consequently, total transmit power needed for the UE to perform sending in the cells may exceed allowed maximum transmit power, where the sending is scheduled in the two cells, and as a result, the UE reduces power, which increases a error probability of transmission; or transmit power that is of the UE and that is on each carrier may be very low, which causes a waste of power resources. In view of this problem, a scenario shown in FIG. 1 is used as an example. Both radio resource control protocol (RRC) functions of the two cells are controlled by means of RRC of the MeNodeB, the prior art proposes that PH-related physical layer information of the UE in the Small cell is sent to the Macro cell, so that the MeNodeB learns of a power use status of the UE in the Small cell according to PH-related physical layer channel configuration information of the Small cell and known RRC configuration information of the SeNodeB, and controls transmit power that is of the UE and that is in the Macro cell, to avoid that total transmit power that is of the UE and that is in the two cells exceeds maximum transmit power.

However, when the MeNodeB and the SeNodeB use independent RRC, in the prior art, the transmit power that is of the UE and that is in the Macro cell cannot be accurately controlled.

SUMMARY

The present invention provides an uplink power control method, user equipment, and a base station, to resolve a technical problem that when a MeNodeB and a SeNodeB use independent RRC, in the prior art, transmit power that is of UE and that is in a Macro cell cannot be accurately controlled.

According to a first aspect, the present invention provides user equipment, including:

a receiver, configured to receive first radio resource control protocol RRC configuration information sent by a first base station, where the first RRC configuration information includes a parameter used to calculate a power headroom PH that is of the UE and that is in a first cell controlled by the first base station; and a transmitter, configured to send second RRC configuration information to a second base station, where the second RRC configuration information includes the parameter used to calculate the PH that is of the UE and that is in the first cell.

With reference to the first aspect, in a first possible implementation manner of the first aspect, the second RRC configuration information is used by the second base station to control transmit power that is of the UE and that is in a second cell controlled by the second base station.

With reference to the first aspect, in a second possible implementation manner of the first aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the first aspect, in a third possible implementation manner of the first aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to a second aspect, the present invention provides a base station, including:

a receiver, configured to receive second radio resource control protocol RRC configuration information sent by user equipment UE, where the second RRC configuration information is sent by the UE after the UE receives a first RRC configuration message sent by a first base station, and both the first RRC configuration information and the second RRC configuration information include a parameter used to calculate a power headroom PH that is of the UE and that is in a first cell controlled by the first base station; and a processor, configured to control, according to the second RRC configuration information, transmit power that is of the UE and that is in a second cell controlled by the second base station.

With reference to the second aspect, in a first possible implementation manner of the second aspect, if the first base station supports a time division duplex TDD mode, the second RRC configuration information further includes subframe ratio information, and the processor is further configured to learn, according to the subframe ratio information, whether a subframe in which the UE is scheduled by the first base station at a next moment is an uplink subframe or a downlink subframe.

With reference to the second aspect, in a second possible implementation manner of the second aspect, the second RRC configuration information further includes semi-persistent scheduling configuration information, and the processor is further configured to learn of, according to the semi-persistent scheduling configuration information, a location of a subframe in which the UE is semi-persistently scheduled by the first base station.

According to a third aspect, the present invention provides a base station, including:

a processor, configured to perform configuration on first radio resource control protocol RRC configuration information for user equipment UE, where the first RRC configuration information includes a parameter used to calculate a power headroom PH that is of the UE and that is in a first cell controlled by a first base station; and a transmitter, configured to send the first RRC configuration information to the UE, so that the UE sends second RRC configuration information to a second base station, where the second RRC configuration information includes the parameter used to calculate the PH that is of the UE and that is in the first cell.

With reference to the third aspect, in a first possible implementation manner of the third aspect, the second RRC configuration information is used by the second base station to control transmit power that is of the UE and that is in a second cell controlled by the second base station.

With reference to the third aspect, in a second possible implementation manner of the third aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the third aspect, in a third possible implementation manner of the third aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to a fourth aspect, the present invention provides user equipment, including:

a receiving module, configured to receive first radio resource control protocol RRC configuration information sent by a first base station, where the first RRC configuration information includes a parameter used to calculate a power headroom PH that is of the UE and that is in a first cell controlled by the first base station; and a sending module, configured to send second RRC configuration information to a second base station, where the second RRC configuration information includes the parameter used to calculate the PH that is of the UE and that is in the first cell.

With reference to the fourth aspect, in a first possible implementation manner of the fourth aspect, the second RRC configuration information is used by the second base station to control transmit power that is of the UE and that is in a second cell controlled by the second base station.

With reference to the fourth aspect, in a second possible implementation manner of the fourth aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the fourth aspect, in a third possible implementation manner of the fourth aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to a fifth aspect, the present invention provides a base station, including:

a receiving module, configured to receive second radio resource control protocol RRC configuration information sent by user equipment UE, where the second RRC configuration information is sent by the UE after the UE receives a first RRC configuration message sent by a first base station, and both the first RRC configuration information and the second RRC configuration information include a parameter used to calculate a power headroom PH that is of the UE and that is in a first cell controlled by the first base station; and a control module, configured to control, according to the second RRC configuration information, transmit power that is of the UE and that is in a second cell controlled by the second base station.

With reference to the fifth aspect, in a first possible implementation manner of the fifth aspect, if the first base station supports a time division duplex TDD mode, the second RRC configuration information further includes subframe ratio information, and the control module is further configured to learn, according to the subframe ratio information, whether a subframe in which the UE is scheduled by the first base station at a next moment is an uplink subframe or a downlink subframe.

With reference to the fifth aspect, in a second possible implementation manner of the fifth aspect, the second RRC configuration information further includes semi-persistent scheduling configuration information, and the control module is further configured to learn of, according to the semi-persistent scheduling configuration information, a location of a subframe in which the UE is semi-persistently scheduled by the first base station.

According to a sixth aspect, the present invention provides a base station, including:

a configuration module, configured to perform configuration on first radio resource control protocol RRC configuration information for user equipment UE, where the first RRC configuration information includes a parameter used to calculate a power headroom PH that is of the UE and that is in a first cell covered by a first base station; and a sending module, configured to send the first RRC configuration information to the UE, so that the UE sends second RRC configuration information to a second base station, where the second RRC configuration information includes the parameter used to calculate the PH that is of the UE and that is in the first cell.

With reference to the sixth aspect, in a first possible implementation manner of the sixth aspect, the second RRC configuration information is used by the second base station to control transmit power that is of the UE and that is in a second cell controlled by the second base station.

With reference to the sixth aspect, in a second possible implementation manner of the sixth aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the sixth aspect, in a third possible implementation manner of the sixth aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to a seventh aspect, the present invention provides an uplink power control method, including:

receiving, by user equipment UE, first radio resource control protocol RRC configuration information sent by a first base station, where the first RRC configuration information includes a parameter used to calculate a power headroom PH that is of the UE and that is in a first cell controlled by the first base station; and sending, by the UE, second RRC configuration information to a second base station, where the second RRC configuration information includes the parameter used to calculate the PH that is of the UE and that is in the first cell.

With reference to the seventh aspect, in a first possible implementation manner of the seventh aspect, the second RRC configuration information is used by the second base station to control transmit power that is of the UE and that is in a second cell controlled by the second base station.

With reference to the seventh aspect, in a second possible implementation manner of the seventh aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the seventh aspect, in a third possible implementation manner of the seventh aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to an eighth aspect, the present invention provides an uplink power control method, including:

receiving, by a second base station, second radio resource control protocol RRC configuration information sent by user equipment UE, where the second RRC configuration information is sent by the UE after the UE receives a first RRC configuration message sent by a first base station, and both the first RRC configuration information and the second RRC configuration information include a parameter used to calculate a power headroom PH that is of the UE and that is in a first cell controlled by the first base station; and controlling, by the second base station according to the second RRC configuration information, transmit power that is of the UE and that is in a second cell controlled by the second base station.

With reference to the eighth aspect, in a first possible implementation manner of the eighth aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the eighth aspect, in a second possible implementation manner of the eighth aspect, the second RRC configuration information further includes semi-persistent scheduling configuration information, so that the second base station learns of, according to the semi-persistent scheduling configuration information, a location of a subframe in which the UE is semi-persistently scheduled by the first base station.

According to a ninth aspect, the present invention provides an uplink power control method, including:

configuring, by a first base station, first radio resource control protocol RRC configuration information for user equipment UE, where the first RRC configuration information includes a parameter used to calculate a power headroom PH that is of the UE and that is in a first cell controlled by the first base station; and sending, by the first base station, the first RRC configuration information to the UE, so that the UE sends second RRC configuration information to a second base station, where the second RRC configuration information includes the parameter used to calculate the PH that is of the UE and that is in the first cell.

With reference to the ninth aspect, in a first possible implementation manner of the ninth aspect, the second RRC configuration information is used by the second base station to control transmit power that is of the UE and that is in a second cell controlled by the second base station.

With reference to the ninth aspect, in a second possible implementation manner of the ninth aspect, if the first base station supports a time division duplex TDD mode, the second RRC configuration information further includes subframe ratio information, where the subframe ratio information is used by the second base station to learn whether a subframe in which the UE is scheduled by the first base station at a next moment is an uplink subframe or a downlink subframe.

With reference to the ninth aspect, in a third possible implementation manner of the ninth aspect, the second RRC configuration information further includes semi-persistent scheduling configuration information, where the semi-persistent scheduling configuration information is used by the second base station to learn of a location of a subframe in which the UE is semi-persistently scheduled by the first base station.

According to the uplink power control method, the user equipment, and the base station provided in the embodiments of the present invention, a receiver receives first RRC configuration information sent by a first base station, and a transmitter sends second RRC configuration information to a second base station, where both the first RRC configuration information and the second RRC configuration information include a parameter used to calculate a PH that is of UE and that is in a first cell, so that the second base station can control, according to the second RRC configuration information, transmit power that exists when the UE performs at a next moment uplink transmission in a second cell controlled by the second base station. The user equipment provided in the embodiments of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

BRIEF DESCRIPTION OF DRAWINGS

To describe the technical solutions in the embodiments of the present invention or in the prior art more clearly, the following briefly describes the accompanying drawings required for describing the embodiments or the prior art. Apparently, the accompanying drawings in the following description show some embodiments of the present invention, and persons of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

User equipment in the present application, that is, a terminal, may be a wireless terminal or a wired terminal. The wireless terminal may refer to a device that provides a user with voice and/or data connectivity, a handheld device with a radio connection function, or another processing device connected to a radio modem. The wireless terminal may communicate with one or more core networks by using a radio access network (such as RAN, Radio Access Network). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges language and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal (Mobile), a remote station, an access point, a remote terminal, an access terminal, a user terminal, a user agent, a user device, or user equipment (UE).

A base station (for example, an access point) involved in this application may refer to a device in communication with a wireless terminal via one or more sectors at an air interface in an access network. The base station may be used to mutually convert a received over-the-air frame and an IP packet and serve as a router between the wireless terminal and a rest portion of the access network, where the rest portion of the access network may include an Internet Protocol (IP) network. The base station may also coordinate attribute management of the air interface. For example, the base station may be a base station (BTS) in GSM or CDMA, may also be a base station (NodeB) in WCDMA, and may further be an evolved NodeB (NodeB, eNB, or e-NodeB, evolutional Node B) in LTE, which is not limited in the present application.

Figure 1:
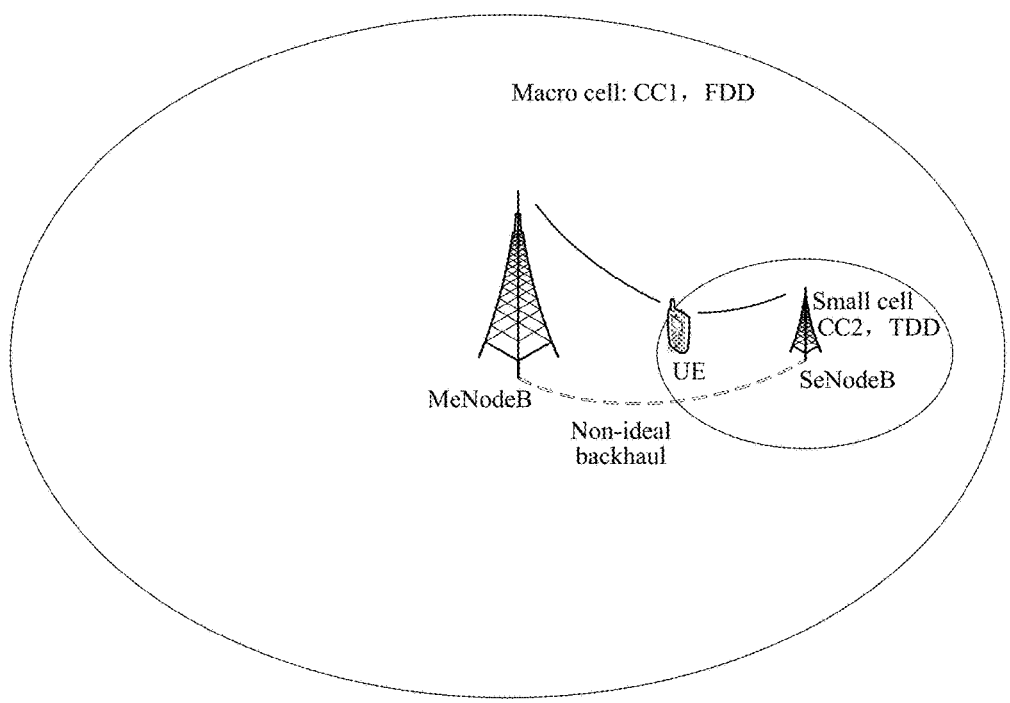
FIG. 1 is a schematic diagram of dual connectivity according to the present invention.
Figure 2:
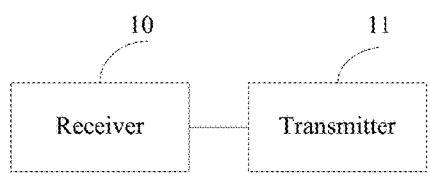
FIG. 2 is a schematic structural diagram of Embodiment 1 of user equipment according to the present invention.

FIG. 2 is a schematic structural diagram of Embodiment 1 of user equipment according to the present invention. As shown in FIG. 2, the user equipment includes: a receiver 10 and a transmitter 11. The receiver 10 is configured to receive first RRC configuration information sent by a first base station, where the first RRC configuration information includes a parameter used to calculate a PH that is of the UE and that is in a first cell controlled by the first base station; and the transmitter 11 is configured to send second RRC configuration information to a second base station, where the second RRC configuration information includes the parameter used to calculate the PH that is of the UE and that is in the first cell.

This embodiment of the present invention is applicable to a scenario of dual connectivity, and two base stations in the scenario of dual connectivity use independent RRC, that is, UE of each base station is separately configured by RRC of the base station.

Specifically, the first base station configures the first RRC configuration information for the UE, and the first RRC configuration information is higher-layer configuration information, and includes the parameter used by the UE and the second base station to calculate the PH that is of the UE and that is in the first cell controlled by the first base station. The first RRC configuration information may include: $P_{O\_PUSCH,c}(j)$, $\alpha_c(j)$, $P_{O\_PUCCH}$, $\Delta_{T \times D}(F')$, a parameter Ks, and $\beta_{offset}^{COI}$. $P_{O\_PUSCH,c}(j)$ is used to set a power offset of an physical uplink shared channel (PUSCH) in different scheduling manners (j), $\alpha_c(j)$ is used to calculate a path loss compensation coefficient in different scheduling manners (j), $P_{O\_PUCCH}$ is used to set a power offset of a physical uplink shared channel (PUCCH), $\Delta_{TxD}(F')$ is used to set a parameter related to a PUCCH format, and the parameter Ks and $\beta_{offset}^{COI}$ are used to calculate a transmission format compensation value $\Delta_{TF,c}(i)$.

The first base station sends the first RRC configuration information to the UE, the receiver 10 receives the first RRC configuration information, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of resource blocks (RB) (that is, a quantity of uplink resources) scheduled previously by the first base station for the UE to perform uplink transmission in the first cell. Optionally, the physical-layer information preset in the UE may be configured by the first base station for the UE, and the physical-layer information may include a quantity of RBs, a scheduling grant manner, transmission format information, and the like that are used when the first base station schedules the UE to perform uplink transmission. A process in which the UE determines, according to the first RRC configuration information and the preset physical-layer information, a PH that exists when the UE previously performs uplink transmission in the first cell is specifically described herein:

Generally, a terminal sends data on a PUSCH and/or a PUCCH, where the data includes user data and/or signaling, and PHs of the UE that are determined by the UE and that are in the first cell may be classified into two types of PHs, which are separately a type 1 and a type 2.

For a PH of the type 1 (Type1), uplink transmission of the UE may be classified into three cases, and correspondingly, the UE calculates the PH by using three formulas:

First formula: In a subframe i of a serving cell (c), the UE sends a PUSCH and does not send a PUCCH, and a corresponding formula is:

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad \text{(Formula 1)}.$$

$P_{CMAX,c}(i)$ is maximum transmit power configured for the UE when a PUSCH channel is transmitted in the subframe i of the serving cell c. The serving cell c herein may be the first cell covered by the first base station. It should be noted that, in this embodiment and all the following embodiments, sending a PUSCH mentioned actually refers to sending data on a PUSCH, and sending a PUCCH mentioned refers to sending data on a PUCCH, and instead, in the communications field, sending a PUSCH or sending a PUCCH is used for short.

Second formula: In the subframe i of the serving cell c, the UE sends a PUSCH and a PUCCH, and a corresponding formula is:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]$$

(Formula 2), where $\tilde{P}_{CMAX,c}(i)$ is maximum transmit power of the UE when a PUSCH channel is transmitted in the subframe i of the serving cell c but the UE assumes that only a PUCCH is transmitted. The serving cell c herein may be the first cell covered by the first base station.

Third formula: When the UE does not send a PUSCH in the subframe i of the serving cell c, the UE sends a virtual type1 (virtual type1) PHR to the serving cell c, where the virtual type1 PHR uses a PUSCH reference format; and a corresponding formula is:

$$PH_{type1,c}(i) = \tilde{P}_{CMAX,c}(i) - \{P_{O\_PUSCH,c}(l) + \alpha_c(l) \cdot PL_c + f_c(i)\}[dB] \quad \text{(Formula 3)},$$ where $\tilde{P}_{CMAX,c}(i)$ is virtual maximum transmit power of the UE that is used when a PUSCH is not transmitted in the subframe i of the serving cell c. The serving cell c herein may be the first cell covered by the first base station.

For other variables in Formula 1, Formula 2, and Formula 3: $M_{PUSCH,c}(i)$ is a quantity of RBs allocated in a subframe i by the first base station for the UE to send a PUSCH. $P_{O\_PUSCH,c}(j)$ is an open-loop power control adjustment value, and a value of $P_{O\_PUSCH,c}(j)$ is configured at a higher layer of the serving cell c in a case of a different value of j. The variable j is related to a scheduling grant manner of a PUSCH. When PUSCH transmission of the UE is performed by means of a semi-persistent scheduling grant, j=0; when PUSCH transmission of the UE is performed by means of a dynamic scheduling grant, j=1; and when PUSCH transmission of the UE is performed by means of a random access response grant, j=2. $\alpha_c(j)$ is a value for compensating for partial path loss, and depends on both a higher-layer configuration parameter and the variable j, where when j=0 or 1, $\alpha_c(j)$ depends on a higher-layer configuration parameter of the serving cell c, and when j=2, $\alpha_c(j)=1$. $PL_c$ is path loss, obtained by measurement by the UE, of the serving cell c. $\Delta_{TF,c}(i)$ is a transmission format compensation value, and is obtained by calculation according to $\Delta_{TF,c}(i) = 10 \log_{10}((2^{BPRE \cdot K_s}-1) \cdot \beta_{offset}^{PUSCH})$ by using bits per resource element (BPRE) of a code stream sent by the UE, a parameter Ks, and $\beta_{offset}^{PUSCH}$. Ks is a higher-layer configuration parameter, and a value of Ks may be 1.25 or 0. BPRE is obtained by calculation by using a quantity of bits for carrying user data and a quantity of resource elements (RE) allocated to the user data. A specific calculation formula is as follows: When a PUSCH carries only control information, $BPRE = O_{CQI}/N_{RE}$, where $O_{CQI}$ is a quantity of channel quality indicator (CQI) or precoding matrix indicator (PMI) bits, $O_{CQI}$ also includes a CQI or PMI cyclic redundancy check (CRC) bit, and $N_{RE}$ is a quantity of REs. When a PUSCH does not carry control information, $$BPRE = \sum_{r=0}^{C-1} K_r/N_{RE},$$

where C is a quantity of code blocks of user data of an uplink PUSCH, and a code block size of the $r^{th}$ code block is Kr. Moreover, when a PUSCH carries only control information, $\beta_{offset}^{PUSCH} = \beta_{offset}^{COI}$, where $\beta_{offset}^{COI}$ is a higher-layer configuration parameter; otherwise, $\beta_{offset}^{PUSCH} = 1$. $f_c(i)$ is a closed-loop power control adjustment value, and depends on a power control command sent by the first base station.

For a PH of the type 2 (Type2), uplink transmission of the UE may be classified into four cases, and correspondingly, the UE calculates the PH by using four formulas:

First formula: The UE simultaneously sends a PUSCH and a PUCCH in a subframe i of a primary cell (that is, the first cell is the primary cell), and a corresponding formula for calculating a PH may be:

$$P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH}+PL_c+h(n_{CQI},n_{HARQ},n_{SR})+\Delta_{P\_PUCCH}(F)+\Delta_{TxD}(F')+g(i))/10}\end{array}\right)[dB].\quad\text{(Formula 4)}$$

Second formula: In a subframe i of a primary cell (that is, the first cell is the primary cell), the UE simultaneously sends only a PUSCH and does not send a PUCCH, and a corresponding formula for calculating a PH may be:

$$P_{type2}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH}+PL_c+g(i))/10}\end{array}\right)[dB].\quad\text{(Formula 5)}$$

Third formula: In a subframe i of a primary cell (that is, the first cell is the primary cell), the UE simultaneously sends only a PUCCH and does not send a PUSCH, and a corresponding formula for calculating a PH may be:

$$P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH}+PL_c+h(n_{CQI},n_{HARQ},n_{SR})+\Delta_{P\_PUCCH}(F)+\Delta_{TxD}(F')+g(i))/10}\end{array}\right)[dB].\quad\text{(Formula 6)}$$

Fourth formula: The UE does not send a PUSCH and a PUCCH in a subframe i of a primary cell (that is, the first cell is the primary cell), the UE sends a virtual type2 (virtual type2) PHR to the primary cell, where the virtual type2 PHR uses PUSCH and PUCCH reference formats (reference format), and a corresponding formula for calculating a PH may be:

$$PH_{type2}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{O\_PUCCH}+PL_c+g(i))/10}\end{array}\right)[dB].\quad\text{(Formula 7)}$$

In Formula 4 to Formula 7, $\Delta_{F\_PUCCH}(F)$ is a parameter related to a PUCCH format, and depends on a higher-layer configuration parameter. $h(n_{CQI},n_{HARQ},n_{SR})$ is a variable related to a PUCCH format, where $n_{CQI}$ is a quantity of CQI bits. If it is configured that a scheduling request (SR) may be transmitted in a subframe i, $n_{SR}=1$; otherwise, $n_{SR}=0$. $n_{HARQ}$ is related to a quantity of serving cells configured for the UE, a PUCCH format of PUCCH transmission, and a quantity of hybrid automatic repeat request-acknowledgement (HARQ-ACK) bits. In different PUCCH formats, $h(n_{CQI},n_{HARQ},n_{SR})$ may be calculated according to corresponding values of $n_{CQI}$, $n_{HARQ}$, and $n_{SR}$. $P_{O\_PUCCH}$ is an open-loop power control adjustment value, and depends on an RRC configuration parameter of the first base station. $\Delta_{TxD}(F')$ is a parameter related to a quantity of antenna ports for sending a PUCCH and a PUCCH format. When a PUCCH is sent by using two antenna ports, $\Delta_{TxD}(F')$ is a parameter related to a PUCCH format, and is configured by a higher layer for the UE by using dedicated signaling; otherwise, $\Delta_{TxD}(F')=0$. $g(i)$ is a closed-loop power control adjustment value, and depends on a power control command sent by the first base station.

With reference to different cases in which the UE sends a PUSCH or a PUCCH, a corresponding formula of Formula 1 to Formula 7 is selected. The UE may calculate, according to a parameter included in the first RRC configuration information and content included in the preset physical-layer information, the PH that is of the UE and that is in the first cell covered and controlled by the first base station, and send the PH to the second base station by using the transmitter 11. Optionally, the PH may be sent to the second base station in a form of a PHR. Moreover, the transmitter 11 further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The second base station can learn of, according to the second RRC configuration information, the physical-layer information preset in the second base station, and the PH of the UE that is sent by the UE and that is in the first cell, physical-layer information such as a quantity of RBs scheduled by the first base station for the UE when the UE previously performs uplink transmission in the first cell, a scheduling grant manner, and transmission format information; and the second base station and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the second base station further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the second base station can learn of a power use status existing when the UE previously performs uplink transmission in the second cell. Finally, with reference to previous power use statuses that are of the UE and that are in the first cell and the second cell, the second base station controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station by using the transmitter 11, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the user equipment provided in this embodiment of the present invention, the receiver receives first RRC configuration information sent by a first base station, and the transmitter sends second RRC configuration information to a second base station, where both the first RRC configuration information and the second RRC configuration information include a parameter used to calculate a PH that is of the UE and that is in a first cell, so that the second base station can control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 2, the second RRC configuration information is used by the second base station to control transmit power that is of the UE and that is in the second cell controlled by the second base station. If the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 1, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD–FDD joint operation. RRC of a TDD eNB (the first base station) and RRC of an FDD eNodeB (the second base station) are independent from each other.

The first base station sends the first RRC configuration information to the UE; the UE calculates, according to the first RRC configuration information and the preset physical-layer information, a PH that exists when the UE previously performs uplink transmission in the first cell, and sends the PH to the second base station and sends the second RRC configuration information to the second base station by using the transmitter 11; and the second base station can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the second base station learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the second base station learns of, according to the subframe ratio information, that the UE performs transmission at a next moment in an uplink subframe, the second base station may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the user equipment provided in this embodiment of the present invention, the receiver receives first RRC configuration information sent by a first base station, and the transmitter sends second RRC configuration information to a second base station, where the second RRC configuration information includes a parameter used to calculate a PH that is of the UE and that is in a first cell and subframe ratio information configured by the first base station for the UE, so that the second base station learns of, according to the subframe ratio information in the second RRC configuration information, whether a subframe in which the UE performs transmission at a next moment is an uplink subframe or a downlink subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

To resolve a technical problem that transmit power of UE cannot be accurately controlled in the prior art when two base stations use independent RRC, optionally, there may also be another implementation manner, and is specifically:

If the first base station supports a TDD mode, and the first base station schedules the UE at a next moment in a downlink subframe, the second RRC configuration information sent by the first base station to the UE may include only the subframe ratio information, that is, does not include the parameter used to calculate the PH that is of the UE and that is in the first cell. In this case, the subframe ratio information is used by the second base station to learn of that a subframe in which the UE is scheduled by the first base station at a next moment is a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE.

That is, the parameter used to calculate the PH that is of the UE and that is in the first cell and the subframe ratio information included in the second RRC configuration information may be in a "and/or" relationship, that is, the second RRC configuration information may include only the parameter used to calculate the PH that is of the UE and that is in the first cell (refer to the technical solution in Embodiment 1), or may include only the subframe ratio information (that is, a scenario in which the UE is scheduled by the first base station at a next moment in a downlink subframe), or may include both the parameter used to calculate the PH that is of the UE and that is in the first cell and the subframe ratio information (that is, a scenario in which the UE is scheduled by the first base station at a next moment in an uplink subframe).

According to the user equipment provided in this embodiment of the present invention, the receiver receives first RRC configuration information sent by a first base station, and the transmitter sends second RRC configuration information to a second base station, where the second RRC configuration information includes subframe ratio information configured by the first base station for the UE, so that the second base station learns of, according to the subframe ratio information in the second RRC configuration information, that a subframe in which the UE performs transmission at a next moment is a downlink subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 2, further, the second RRC configuration information includes semi-persistent scheduling configuration information, and the semi-persistent scheduling configuration information is used by the second base station to learn of a location of a subframe in which the UE is semi-persistently scheduled by the first base station.

Specifically, the second RRC configuration information not only includes $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 1, but also includes the semi-persistent scheduling configuration information. The second base station may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the second base station learns of, according to the semi-persistent scheduling configuration information, that the UE performs transmission at a next moment in the semi-persistent scheduling subframe, the second base station may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the second base station can accurately estimate an RB scheduling status that is of the UE at a next moment and that is in the second cell controlled by the second base station, to control transmit power that is of the UE at a next moment and that is in the second cell. If the second base station learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the user equipment provided in this embodiment of the present invention, the receiver receives first RRC configuration information sent by a first base station, and the transmitter sends second RRC configuration information to a second base station, where the second RRC configuration information includes a parameter used to calculate a PH that is of the UE and that is in a first cell and semi-persistent scheduling configuration information configured by the first base station for the UE, so that the second base station learns of, according to the semi-persistent scheduling configuration information in the second RRC configuration information, whether a subframe in which the UE performs transmission at a next moment is a semi-persistent scheduling subframe or a non-semi-persistent scheduling subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

To resolve a technical problem that transmit power of UE cannot be accurately controlled in the prior art when two base stations use independent RRC, optionally, there may also be another implementation manner, and is specifically:

The first base station sends the first RRC configuration information to the UE, so that the UE sends the second RRC configuration information to the second base station. If the first base station schedules the UE at a next moment in the semi-persistent scheduling subframe, the second RRC configuration information may include only the semi-persistent scheduling configuration information, that is, does not include the parameter used to calculate the PH that is of the UE and that is in the first cell. In this case, the semi-persistent scheduling configuration information is used by the second base station to learn of that a subframe in which the UE is scheduled by the first base station at a next moment is a semi-persistent scheduling subframe, and learn of a location of the semi-persistent scheduling subframe. In the semi-persistent scheduling subframe, physical-layer information configured by the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

The second base station learns of, according to the semi-persistent scheduling configuration information, that the UE performs transmission at a next moment in the semi-persistent scheduling subframe, and the second base station may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the second base station can accurately estimate an RB scheduling status that is of the UE at a next moment and that is in the second cell controlled by the second base station, to control transmit power that is of the UE at a next moment and that is in the second cell.

That is, the parameter used to calculate the PH that is of the UE and that is in the first cell and the semi-persistent scheduling subframe configuration information included in the second RRC configuration information may be in a "and/or" relationship, that is, the second RRC configuration information may include only the parameter used to calculate the PH that is of the UE and that is in the first cell (refer to the technical solution in Embodiment 1), or may include only semi-persistent scheduling configuration information (that is, a scenario in which the UE is scheduled by the first base station at a next moment in a semi-persistent scheduling subframe), or may include both the parameter used to calculate the PH that is of the UE and that is in the first cell and the subframe ratio information (that is, a scenario in which the UE is scheduled by the first base station at a next moment in a non-semi-persistent scheduling subframe).

According to the user equipment provided in this embodiment of the present invention, the receiver receives first RRC configuration information sent by a first base station, and the transmitter sends second RRC configuration information to a second base station, where the second RRC configuration information includes semi-persistent scheduling subframe configuration information configured by the first base station for the UE, so that the second base station learns of, according to the semi-persistent scheduling configuration information in the second RRC configuration information, that a subframe in which the UE performs transmission at a next moment is a semi-persistent scheduling subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 3:
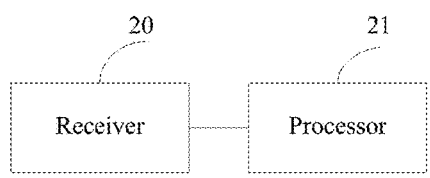
FIG. 3 is a schematic structural diagram of Embodiment 1 of a base station according to the present invention.

FIG. 3 is a schematic structural diagram of Embodiment 1 of a base station according to the present invention. As shown in FIG. 3, the base station is a second base station, and the base station includes: a receiver 20 and a processor 21. The receiver 20 receives second RRC configuration information sent by UE, where the second RRC configuration information is sent by the UE after the UE receives a first RRC configuration message sent by a first base station, and both the first RRC configuration information and the second RRC configuration information include a parameter used to calculate a PH that is of the UE and that is in a first cell controlled by the first base station; and the processor 21 controls, according to the second RRC configuration information, transmit power that is of the UE and that is in a second cell controlled by the second base station.

This embodiment of the present invention is applicable to a scenario of dual connectivity, and two base stations in the scenario of dual connectivity use independent RRC, that is, UE of each base station is separately configured by RRC of the base station.

Specifically, the first base station configures the first RRC configuration information for the UE, and the first RRC configuration information is higher-layer configuration information, and includes the parameter used by the UE and the second base station to calculate the PH that is of the UE and that is in the first cell covered by the first base station. The first RRC configuration information may include: $P_{O\_PUSCH,c}(j)$, $\alpha_c(j)$, $P_{O\_PUCCH}$, $\Delta_{TxD}(F')$, a parameter Ks, and $\beta_{offset}^{COI}$. $P_{O\_PUSCH,c}(j)$ is used to set a power offset of a PUSCH in different scheduling manners (j), $\alpha_c(j)$ is used to calculate a path loss compensation coefficient in different scheduling manners (j), $P_{O\_PUCCH}$ is used to set a power offset of a PUCCH, $\Delta_{TxD}(F')$ is used to set a parameter related to a PUCCH format, and the parameter Ks and $\beta_{offset}^{COI}$ are used to calculate a transmission format compensation value $\Delta_{TF,c}(i)$.

The first base station sends the first RRC configuration information to the UE, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of RBs (that is, a quantity of uplink resources) scheduled previously by the first base station for the UE to perform uplink transmission in the first cell. Optionally, the physical-layer information preset in the UE may be sent by the first base station to the UE, and the physical-layer information may include a quantity of RBs, a scheduling grant manner, transmission format information, and the like that are used when the first base station schedules the UE to perform uplink transmission. For a process in which the UE determines, according to the first RRC configuration information and the preset physical-layer information, a PH that exists when the UE previously performs uplink transmission in the first cell, refer to the description in Embodiment 1, and details are not described herein again.

With reference to different cases in which the UE sends a PUSCH or a PUCCH, a corresponding formula of Formula 1 to Formula 7 is selected. The UE may calculate, according to a parameter included in the first RRC configuration information and content included in the preset physical-layer information, the PH that is of the UE and that is in the first cell controlled by the first base station, and send the PH to the second base station. Optionally, the PH may be sent to the second base station in a form of a PHR. Moreover, the UE further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The receiver 20 receives the second RRC configuration information sent by the UE, and the processor 21 can learn of, according to the second RRC configuration information, the physical-layer information preset in the second base station, and the PH that is of the UE and that is in the first cell, physical-layer information such as a quantity of RBs scheduled by the first base station for the UE when the UE previously performs uplink transmission in the first cell, a scheduling grant manner, and transmission format information; and the processor 21 and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the processor 21 further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the processor 21 can learn of a power use status existing when the UE previously performs uplink transmission in the second cell. Finally, with reference to previous power use statuses that are of the UE and that are in the first cell and the second cell, the processor 21 controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the processor 21 of the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the base station provided in this embodiment of the present invention, a receiver receives second RRC configuration information sent by UE, where the second RRC configuration information includes a parameter used to calculate a PH that is of the UE and that is in a first cell, and the processor controls, according to the second RRC configuration information, physical-layer information preset in a second base station, and the PH that is of the UE and that is in the first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 3, further, if the first base station supports a TDD mode, the second RRC configuration information further includes subframe ratio information, and the processor 21 is further configured to learn, according to the subframe ratio information, whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 2, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD–FDD joint operation if RRC of a TDD eNB (the first base station) and RRC of an FDD eNodeB (the second base station) are independent from each other.

The first base station sends the first RRC configuration information to the UE; the UE calculates, according to the first RRC configuration information and the preset physical-layer information, a PH that exists when the UE previously performs uplink transmission in the first cell, and sends the PH and the second RRC configuration information to the second base station; and the receiver 20 receives the second RRC configuration information and the PH that is of the UE and that is in the first cell, and the processor 21 can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the processor 21 learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the processor 21 learns of, according to the subframe ratio information, that the UE performs transmission at a next moment in an uplink subframe, the processor 21 may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the base station provided in this embodiment of the present invention, the receiver receives second RRC configuration information sent by UE, and the processor learns of, according to subframe ratio information in the second RRC configuration information, whether a subframe in which the UE performs transmission at a next moment is an uplink subframe or a downlink subframe, so that the processor can better control, according to the second RRC configuration information, physical-layer information preset in a second base station, and a PH that is of the UE and that is in the first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 3, further, the second RRC configuration information includes semi-persistent scheduling configuration information, and the processor 21 is further configured to learn of, according to the semi-persistent scheduling configuration information, a location of a subframe in which the UE is semi-persistently scheduled by the first base station.

Specifically, the UE sends the second RRC configuration information and the PH that is of the UE and that is in the first cell to the second base station, where the RRC configuration information not only includes $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 1, but also includes the semi-persistent scheduling configuration information. The receiver 20 receives the second RRC configuration information and the PH that is of the UE and that is in the first cell, and the processor 21 may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the processor 21 learns of, according to the semi-persistent scheduling configuration information, that the UE performs transmission at a next moment in the semi-persistent scheduling subframe, the processor 21 may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the processor 21 can accurately estimate an RB scheduling status that is of the UE at a next moment and that is in the second cell controlled by the second base station, to control transmit power that is of the UE at a next moment and that is in the second cell. If the processor 21 learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the base station provided in this embodiment of the present invention, the receiver receives second RRC configuration information sent by UE, and the processor learns of, according to semi-persistent scheduling configuration information in the second RRC configuration information, whether a subframe in which the UE performs transmission at a next moment is a semi-persistent scheduling subframe or a non-semi-persistent scheduling subframe, so that the processor can better control, according to the second RRC configuration information, physical-layer information preset in a second base station, and a PH that is of the UE and that is in a first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 4:
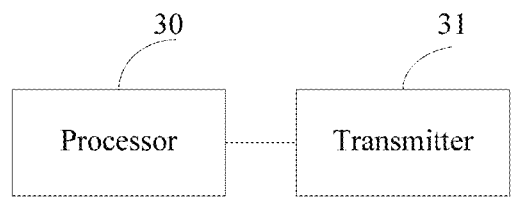
FIG. 4 is a schematic structural diagram of Embodiment 2 of a base station according to the present invention.

FIG. 4 is a schematic structural diagram of Embodiment 2 of a base station according to the present invention. The base station is a first base station, and as shown in FIG. 4, the base station includes: a processor 30 and a transmitter 31. The processor 30 is configured to perform configuration on first RRC configuration information for UE, where the first RRC configuration information includes a parameter used to calculate a PH that is of the UE and that is in a first cell controlled by the first base station; and the transmitter 31 is configured to send the first RRC configuration information to the UE, so that the UE sends second RRC configuration information to a second base station, where the second RRC configuration information includes the parameter used to calculate the PH that is of the UE and that is in the first cell.

This embodiment of the present invention is applicable to a scenario of dual connectivity, and two base stations in the scenario of dual connectivity use independent RRC, that is, UE of each base station is separately configured by RRC of the base station.

Specifically, the processor 30 configures the first RRC configuration information for the UE, and the first RRC configuration information is higher-layer configuration information, and includes the parameter used by the UE and the second base station to calculate the PH that is of the UE and that is in the first cell covered by the first base station. The first RRC configuration information may include: $P_{O\_PUSCH,c}(j)$, $\alpha_c(j)$, $P_{O\_PUCCH}$, $\Delta_{TxD}(F')$, a parameter Ks, and $\beta_{offset}^{COI}$. $P_{O\_PUSCH,c}(j)$ is used to set a power offset of a PUSCH in different scheduling manners (j), $\alpha_c(j)$ is used to calculate a path loss compensation coefficient in different scheduling manners (j), $P_{O\_PUCCH}$ is used to set a power offset of a PUCCH, $\Delta_{TxD}(F')$ is used to set a parameter related to a PUCCH format, and the parameter Ks and $\beta_{offset}^{COI}$ are used to calculate a transmission format compensation value $\Delta_{TF,c}(i)$.

The transmitter 31 sends the first RRC configuration information to the UE, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of RBs (that is, a quantity of uplink resources) scheduled previously by the first base station for the UE to perform uplink transmission in the first cell. For that the UE determines, according to the first RRC configuration information and the preset physical-layer information, a PH that exists when the UE previously performs uplink transmission in the first cell, refer to the description in Embodiment 1, and details are not described herein again.

With reference to different cases in which the UE sends a PUSCH or a PUCCH, a corresponding formula of Formula 1 to Formula 7 is selected. The UE may calculate, according to a parameter included in the first RRC configuration information and content included in the physical-layer information preset in the UE, the PH that is of the UE and that is in the first cell controlled by the first base station, and send the PH to the second base station. Optionally, the PH may be sent to the second base station in a form of a PHR. Moreover, the UE further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The second base station learns of, according to the second RRC configuration information, the physical-layer information preset in the second base station, and the PH that is of the UE and that is in the first cell, physical-layer information such as a quantity of RBs scheduled by the first base station for the UE when the UE previously performs uplink transmission in the first cell, a scheduling grant manner, and transmission format information; and the second base station and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the second base station further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the second base station can learn of a power use status existing when the UE previously performs uplink transmission in the second cell. Finally, with reference to previous power use statuses that are of the UE and that are in the first cell and the second cell, the second base station controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the base station provided in this embodiment of the present invention, the processor configures first RRC configuration information for UE, and the transmitter sends the first RRC configuration information to the UE, so that the UE may acquire, according to the first RRC configuration information and physical-layer information preset in the UE, a PH that is of the UE and that is in a first cell controlled by a first base station, and the UE sends second RRC configuration information to a second base station, so that the second base station may control, according to the second RRC configuration information, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 4, the second RRC configuration information is used by the second base station to control transmit power that is of the UE and that is in the second cell controlled by the second base station. Further, if the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 2, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD-FDD joint operation if RRC of a TDD eNB (the first base station) and RRC of an FDD eNodeB (the second base station) are independent from each other.

The transmitter 31 sends the first RRC configuration information to the UE; the UE calculates, according to the first RRC configuration information and the physical-layer information preset in the UE, a PH that exists when the UE previously performs uplink transmission in the first cell, and the UE sends the PH to the second base station and sends the second RRC configuration information to the second base station; and the second base station can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the second base station learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the second base station learns of, according to the subframe ratio information, that the UE performs transmission at a next moment in an uplink subframe, the second base station may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the base station provided in this embodiment of the present invention, the processor configures first RRC configuration information for UE, and the transmitter sends the first RRC configuration information to the UE, so that the UE may acquire, according to the first RRC configuration information and physical-layer information preset in the UE, a PH that is of the UE and that is in a first cell controlled by a first base station, and the UE sends second RRC configuration information to a second base station, so that the second base station can learn, according to subframe ratio information in the second RRC configuration information, whether a subframe in which the UE performs transmission at a next moment is an uplink subframe or a downlink subframe, and can more accurately control transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 4, further, the second RRC configuration information includes semi-persistent scheduling configuration information, and the subframe ratio information is used by the second base station to learn of a location of a subframe in which the UE is semi-persistently scheduled by the first base station.

Specifically, the second RRC configuration information not only includes $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 2, but also includes the semi-persistent scheduling configuration information. The second base station may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the processor 30 of the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the second base station learns of, according to the semi-persistent scheduling configuration information, that the UE performs transmission at a next moment in the semi-persistent scheduling subframe, the second base station may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the second base station can accurately estimate an RB scheduling status that is of the UE at a next moment and that is in the second cell controlled by the second base station, to control transmit power that is of the UE at a next moment and that is in the second cell. If the second base station learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the base station provided in this embodiment of the present invention, the processor configures first RRC configuration information for UE, and the transmitter sends the first RRC configuration information to the UE, so that the UE may acquire, according to the first RRC configuration information and physical-layer information preset in the UE, a PH that is of the UE and that is in a first cell controlled by a first base station, the UE sends second RRC configuration information to a second base station, where the second RRC configuration information includes a parameter used to calculate a PH that is of the UE and that is in the first cell and semi-persistent scheduling configuration information configured by the first base station for the UE, so that the second base station learns of, according to the semi-persistent scheduling configuration information in the second RRC configuration information, whether a subframe in which the UE performs transmission at a next moment is a semi-persistent scheduling subframe or a non-semi-persistent scheduling subframe, and the second base station can better control, according to the second RRC configuration information, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 5:
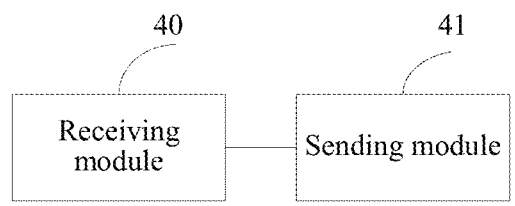
FIG. 5 is a schematic structural diagram of Embodiment 2 of user equipment according to the present invention.

FIG. 5 is a schematic structural diagram of Embodiment 2 of user equipment according to the present invention. As shown in FIG. 5, the user equipment includes: a receiving module 40 and a sending module 41. The receiving module 40 is configured to receive first RRC configuration information sent by a first base station, where the first RRC configuration information includes a parameter used to calculate a PH that is of the UE and that is in a first cell controlled by the first base station; and the sending module 41 is configured to send second RRC configuration information to a second base station, where the second RRC configuration information includes the parameter used to calculate the PH that is of the UE and that is in the first cell.

This embodiment of the present invention is applicable to a scenario of dual connectivity, and two base stations in the scenario of dual connectivity use independent RRC, that is, UE of each base station is separately configured by RRC of the base station.

Specifically, the first base station configures the first RRC configuration information for the UE, and the first RRC configuration information is higher-layer configuration information, and includes the parameter used by the UE and the second base station to calculate the PH that is of the UE and that is in the first cell controlled by the first base station. The first RRC configuration information may include: $P_{O\_PUSCH,c}(j)$, $\alpha_c(j)$, $P_{O\_PUCCH}$, $\Delta_{TxD}(F')$, a parameter Ks, and $\beta_{offset}^{COI}$. $P_{O\_PUSCH,c}(j)$ is used to set a power offset of a PUSCH in different scheduling manners (j), $\alpha_c(j)$, is used to calculate a path loss compensation coefficient in different scheduling manners (j), $P_{O\_PUCCH}$ is used to set a power offset of a PUCCH, $\Delta_{T \times D}(F')$ is used to set a parameter related to a PUCCH format, and the parameter Ks and $\beta_{offset}^{COI}$ are used to calculate a transmission format compensation value $\Delta_{TF,c}(i)$.

The first base station sends the first RRC configuration information to the UE, the receiving module 40 receives the first RRC configuration information, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of RBs (that is, a quantity of uplink resources) scheduled previously by the first base station for the UE to perform uplink transmission in the first cell. Optionally, the physical-layer information preset in the UE may be configured by the first base station for the UE, and the physical-layer information may include a quantity of RBs, a scheduling grant manner, transmission format information, and the like that are used when the first base station schedules the UE to perform uplink transmission. A process in which the UE determines, according to the first RRC configuration information and the preset physical-layer information, a PH that exists when the UE previously performs uplink transmission in the first cell is specifically described herein:

Generally, a terminal sends data on a PUSCH and/or a PUCCH, where the data includes user data and/or signaling, and PHs of the UE that are determined by the UE and that are in the first cell may be classified into two types of PHs, which are separately a type 1 and a type 2.

For a PH of the type 1 (Type1), uplink transmission of the UE may be classified into three cases, and correspondingly, the UE calculates the PH by using three formulas:

First formula: In a subframe i of a serving cell (cell, c for short), the UE sends a PUSCH and does not send a PUCCH, and a corresponding formula is:

$$PH_{type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB] \quad \text{(Formula 1)}.$$

$P_{CMAX,c}(i)$ is maximum transmit power configured for the UE when a PUSCH channel is transmitted in the subframe i of the serving cell c. The serving cell c herein may be the first cell covered by the first base station. It should be noted that, in this embodiment and all the following embodiments, sending a PUSCH mentioned actually refers to sending data on a PUSCH, and sending a PUCCH mentioned refers to sending data on a PUCCH, and instead, in the communications field, sending a PUSCH or sending a PUCCH is used for short.

Second formula: In the subframe i of the serving cell c, the UE sends a PUSCH and a PUCCH, and a corresponding formula is:

$$PH_{type1,c}(i) = \tilde{P}_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}[dB]$$

(Formula 2), where $\tilde{P}_{CMAX,c}(i)$ is maximum transmit power of the UE when a PUSCH channel is transmitted in the subframe i of the serving cell c but the UE assumes that only a PUCCH is transmitted. The serving cell c herein may be the first cell covered by the first base station.

Third formula: When the UE does not send a PUSCH in the subframe i of the serving cell c, the UE sends a virtual type1 (virtual type1) PHR to the serving cell c, where the virtual type1 PHR uses a PUSCH reference format (reference format); and a corresponding formula is:

$$PH_{type1,c}(i) = \tilde{P}_{CMAX,c}(i) - \{P_{O\_PUSCH,c}(l) + \alpha_c(l) \cdot PL_c + f_c(i)\}[dB] \quad \text{(Formula 3)}, \text{ where}$$

$\tilde{P}_{CMAX,c}(i)$ is virtual maximum transmit power of the UE that is used when a PUSCH is not transmitted in the subframe i of the serving cell c. The serving cell c herein may be the first cell covered by the first base station.

For other variables in Formula 1, Formula 2, and Formula 3: $M_{PUSCH,c}(i)$ is a quantity of RBs allocated in a subframe i by the first base station for the UE to send a PUSCH. $P_{O\_PUSCH,c}(j)$ is an open-loop power control adjustment value, and a value of $P_{O\_PUSCH,c}(j)$ is configured at a higher layer of the serving cell c in a case of a different value of j. The variable j is related to a scheduling grant manner of a PUSCH. When PUSCH transmission of the UE is performed by means of a semi-persistent scheduling grant, j=0; when PUSCH transmission of the UE is performed by means of a dynamic scheduling grant, j=1; and when PUSCH transmission of the UE is performed by means of a random access response grant, j=2. $\alpha_c(j)$ is a value for compensating for partial path loss, and depends on both a higher-layer configuration parameter and the variable j, where when j=0 or 1, $\alpha_c(j)$ depends on a higher-layer configuration parameter of the serving cell c, and when j=2, $\alpha_c(j)=1$. $PL_c$ is path loss, obtained by measurement by the UE, of the serving cell c. $\Delta_{TF,c}(i)$ is a transmission format compensation value, and is obtained by calculation according to $\Delta_{TF,c}(i) = 10 \log_{10}((2^{BPRE \cdot K_s} - 1) \cdot \beta_{offset}^{PUSCH})$ by using BPRE of a code stream sent by the UE, a parameter Ks, and $\beta_{offset}^{PUSCH}$. Ks is a higher-layer configuration parameter, and a value of Ks may be 1.25 or 0. BPRE is obtained by calculation by using a quantity of bits for carrying user data and a quantity of resource elements (Resource Element, RE for short below) allocated to the user data. A specific calculation formula is as follows: When a PUSCH carries only control information, $BPRE = O_{CQI}/N_{RE}$, where $O_{CQI}$ is a quantity of CQI or PMI bits, $O_{CQI}$ also includes a CQI or PMI CRC bit, and $N_{RE}$ is a quantity of REs. When a PUSCH does not carry control information, $$BPRE = \sum_{r=0}^{C-1} K_r / N_{RE},$$

where C is a quantity of code blocks of user data of an uplink PUSCH, and a code block size of the $r^{th}$ code block is Kr. Moreover, when a PUSCH carries only control information, $\beta_{offset}^{PUSCH} = \beta_{offset}^{COI}$, where $\beta_{offset}^{COI}$ is a higher-layer configuration parameter; otherwise, $\beta_{offset}^{PUSCH} = 1$. $f_c(i)$ is a closed-loop power control adjustment value, and depends on a power control command sent by the first base station.

For a PH of the type 2 (Type2), uplink transmission of the UE may be classified into four cases, and correspondingly, the UE calculates the PH by using four formulas:

First formula: The UE simultaneously sends a PUSCH and a PUCCH in a subframe i of a primary cell (that is, the first cell is the primary cell), and a corresponding formula for calculating a PH may be:

$$P_{CMAX,c}(i) - 10\log_{10}\left( \begin{array}{l} 10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH}+PL_c+h(n_{CQI},n_{HARQ},n_{SR})+\Delta_{P\_PUCCH}(F)+\Delta_{TxD}(F')+g(i))/10} \end{array} \right)[dB].$$ (Formula 4)

Second formula: In a subframe i of a primary cell (that is, the first cell is the primary cell), the UE simultaneously sends only a PUSCH and does not send a PUCCH, and a corresponding formula for calculating a PH may be:

$$P_{type2}(i) = P_{CMAX,c}(i) - 10\log_{10}\left( \begin{array}{l} 10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH}+PL_c+g(i))/10} \end{array} \right)[dB].$$ (Formula 5)

Third formula: In a subframe i of a primary cell (that is, the first cell is the primary cell), the UE simultaneously sends only a PUCCH and does not send a PUSCH, and a corresponding formula for calculating a PH may be:

$$P_{CMAX,c}(i) - 10\log_{10}\left( \begin{array}{l} 10^{(P_{O\_PUSCH,c}(1)+\alpha_c(1)\cdot PL_c+f_c(i))/10} + \\ 10^{(P_{O\_PUCCH}+PL_c+h(n_{CQI},n_{HARQ},n_{SR})+\Delta_{P\_PUCCH}(F)+\Delta_{TxD}(F')+g(i))/10} \end{array} \right)[dB].$$ (Formula 6)

Fourth formula: The UE does not send a PUSCH and a PUCCH in a subframe i of a primary cell (that is, the first cell is the primary cell), the UE sends a virtual type2 (virtual type2) PHR to the primary cell, where the virtual type2 PHR uses PUSCH and PUCCH reference formats (reference format), and a corresponding formula for calculating a PH may be:

$$PH_{type2}(i) = \tilde{P}_{CMAX,c}(i) - 10\log_{10}\left( \begin{array}{l} 10^{(P_{O\_PUSCH,c}(1)+\alpha_c(1)\cdot PL_c+f_c(i))/10} + \\ 10^{(P_{O\_PUCCH}+PL_c+g(i))/10} \end{array} \right)[dB].$$ (Formula 7)

In Formula 4 to Formula 7, $\Delta_{F\_PUCCH}(F)$ is a parameter related to a PUCCH format, and depends on a higher-layer configuration parameter. $h(n_{CQI}, n^{HARQ}, n_{SR})$ is a variable related to a PUCCH format, where $n_{CQI}$ is a quantity of CQI bits. If it is configured that an SR may be transmitted in a subframe i, $n_{SR}=1$; otherwise, $n_{SR}=0$; $n_{HARQ}$ is related to a quantity of serving cells configured for the UE, a PUCCH format of PUCCH transmission, and a quantity of HARQ-ACK bits. In different PUCCH formats, $h(n_{CQI}, n_{HARQ}, n_{SR})$ may be calculated according to corresponding values of $n_{CQI}$, $n_{HARQ}$, and $n_{SR}$. $P_{O\_PUCCH}$ is an open-loop power control adjustment value, and depends on an RRC configuration parameter of the first base station. $\Delta_{TxD}(F')$ is a parameter related to a quantity of antenna ports for sending a PUCCH and a PUCCH format. When a PUCCH is sent by using two antenna ports, $\Delta_{TxD}(F')$ is a parameter related to a PUCCH format, and is configured by a higher layer for the UE by using dedicated signaling; otherwise, $\Delta_{TxD}(F')=0$. $g(i)$ is a closed-loop power control adjustment value, and depends on a power control command sent by the first base station.

With reference to different cases in which the UE sends a PUSCH or a PUCCH, a corresponding formula of Formula 1 to Formula 7 is selected. The UE may calculate, according to a parameter included in the first RRC configuration information and content included in the preset physical-layer information, the PH that is of the UE and that is in the first cell covered and controlled by the first base station, and send the PH to the second base station by using the sending module 41. Optionally, the PH may be sent to the second base station in a form of a PHR. Moreover, the sending module 41 further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The second base station can learn of, according to the second RRC configuration information, the physical-layer information preset in the second base station, and the PH of the UE that is sent by the UE and that is in the first cell, physical-layer information such as a quantity of RBs scheduled by the first base station for the UE when the UE previously performs uplink transmission in the first cell, a scheduling grant manner, and transmission format information; and the second base station and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the second base station further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the second base station can learn of a power use status existing when the UE previously performs uplink transmission in the second cell. Finally, with reference to previous power use statuses that are of the UE and that are in the first cell and the second cell, the second base station controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station by using the sending module 41, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the user equipment provided in this embodiment of the present invention, the receiving module receives first RRC configuration information sent by a first base station, and the sending module sends second RRC configuration information to a second base station, where both the first RRC configuration information and the second RRC configuration information include a parameter used to calculate a PH that is of the UE and that is in a first cell, so that the second base station can control, according to the second RRC configuration information, transmit power that exists when the UE performs at a next moment uplink transmission in a second cell controlled by the second base station. The user equipment provided in the embodiments of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 5, the second RRC configuration information is used by the second base station to control transmit power that is of the UE and that is in the second cell controlled by the second base station. If the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 1, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD−FDD joint operation if RRC of a TDD eNB (the first base station) and RRC of an FDD eNodeB (the second base station) are independent from each other.

The first base station sends the first RRC configuration information to the UE; the UE calculates, according to the first RRC configuration information and the preset physical-layer information, a PH that exists when the UE previously performs uplink transmission in the first cell, and sends the PH to the second base station and sends the second RRC configuration information to the second base station by using the sending module 41; and the second base station can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the second base station learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the second base station learns of, according to the subframe ratio information, that the UE performs transmission at a next moment in an uplink subframe, the second base station may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the user equipment provided in this embodiment of the present invention, the receiving module receives first RRC configuration information sent by a first base station, and the sending module sends second RRC configuration information to a second base station, where the second RRC configuration information includes a parameter used to calculate a PH that is of the UE and that is in a first cell and subframe ratio information configured by the first base station for the UE, so that the second base station learns of, according to the subframe ratio information in the second RRC configuration information, whether a subframe in which the UE performs transmission at a next moment is an uplink subframe or a downlink subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 5, further, the second RRC configuration information includes semi-persistent scheduling configuration information, and the semi-persistent scheduling configuration information is used by the second base station to learn of a location of a subframe in which the UE is semi-persistently scheduled by the first base station.

Specifically, the second RRC configuration information not only includes $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 1, but also includes the semi-persistent scheduling configuration information. The second base station may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the second base station learns of, according to the semi-persistent scheduling configuration information, that the UE performs transmission at a next moment in the semi-persistent scheduling subframe, the second base station may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the second base station can accurately estimate an RB scheduling status that is of the UE at a next moment and that is in the second cell controlled by the second base station, to control transmit power that is of the UE at a next moment and that is in the second cell. If the second base station learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the user equipment provided in this embodiment of the present invention, the receiving module receives first RRC configuration information sent by a first base station, and the sending module sends second RRC configuration information to a second base station, where the second RRC configuration information includes a parameter used to calculate a PH that is of the UE and that is in a first cell and semi-persistent scheduling configuration information configured by the first base station for the UE, so that the second base station learns of, according to the semi-persistent scheduling configuration information in the second RRC configuration information, whether a subframe in which the UE performs transmission at a next moment is a semi-persistent scheduling subframe or a non-semi-persistent scheduling subframe, and the second base station can better control, according to the second RRC configuration information, transmit power that exists when the UE performs at a next moment uplink transmission in a second cell controlled by the second base station. The user equipment provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 6:
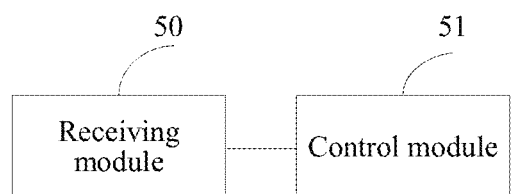
FIG. 6 is a schematic structural diagram of Embodiment 3 of a base station according to the present invention.

FIG. 6 is a schematic structural diagram of Embodiment 3 of a base station according to the present invention. As shown in FIG. 6, the base station is a second base station, and the base station includes: a receiving module 50 and a control module 51. The receiving module 50 receives second RRC configuration information sent by UE, where the second RRC configuration information is sent by the UE after the UE receives a first RRC configuration message sent by a first base station, and both the first RRC configuration information and the second RRC configuration information include a parameter used to calculate a PH that is of the UE and that is in a first cell controlled by the first base station; and the control module 51 is configured to control, according to the second RRC configuration information, transmit power that is of the UE and that is in a second cell controlled by the second base station.

This embodiment of the present invention is applicable to a scenario of dual connectivity, and two base stations in the scenario of dual connectivity use independent RRC, that is, UE of each base station is separately configured by RRC of the base station.

Specifically, the first base station configures the first RRC configuration information for the UE, and the first RRC configuration information is higher-layer configuration information, and includes the parameter used by the UE and the second base station to calculate the PH that is of the UE and that is in the first cell covered by the first base station. The first RRC configuration information may include: $P_{O\_PUSCH,c}(j)$, $\alpha_c(j)$, $P_{O\_PUCCH}$, $\Delta_{TxD}(F')$, a parameter Ks, and $\beta_{offset}^{COI}$. $P_{O\_PUSCH,c}(j)$ is used to set a power offset of a PUSCH in different scheduling manners (j), $\alpha_c(j)$ is used to calculate a path loss compensation coefficient in different scheduling manners (j), $P_{O\_PUCCH}$ is used to set a power offset of a PUCCH, $\Delta_{T \times D}(F')$ is used to set a parameter related to a PUCCH format, and the parameter Ks and $\beta_{offset}^{CQI}$ are used to calculate a transmission format compensation value $\Delta_{TF,c}(i)$.

The first base station sends the first RRC configuration information to the UE, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of RBs (that is, a quantity of uplink resources) scheduled previously by the first base station for the UE to perform uplink transmission in the first cell. Optionally, the physical-layer information preset in the UE may be sent by the first base station to the UE, and the physical-layer information may include a quantity of RBs, a scheduling grant manner, transmission format information, and the like that are used when the first base station schedules the UE to perform uplink transmission. For a process in which the UE determines, according to the first RRC configuration information and the preset physical-layer information, a PH that exists when the UE previously performs uplink transmission in the first cell, refer to the description in Embodiment 1, and details are not described herein again.

With reference to different cases in which the UE sends a PUSCH or a PUCCH, a corresponding formula of Formula 1 to Formula 7 is selected. The UE may calculate, according to a parameter included in the first RRC configuration information and content included in the preset physical-layer information, the PH that is of the UE and that is in the first cell controlled by the first base station, and send the PH to the second base station. Optionally, the PH may be sent to the second base station in a form of a PHR. Moreover, the UE further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The receiving module 50 receives the second RRC configuration information sent by the UE, and the control module 51 can learn of, according to the second RRC configuration information, the physical-layer information preset in the second base station, and the PH that is of the UE and that is in the first cell, physical-layer information such as a quantity of RBs scheduled by the first base station for the UE when the UE previously performs uplink transmission in the first cell, a scheduling grant manner, and transmission format information; and the processor 21 and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the control module 51 further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the control module 51 can learn of a power use status existing when the UE previously performs uplink transmission in the second cell. Finally, with reference to previous power use statuses that are of the UE and that are in the first cell and the second cell, the control module 51 controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the control module 51 of the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the base station provided in this embodiment of the present invention, the receiving module receives second RRC configuration information sent by UE, where the second RRC configuration information includes a parameter used to calculate a PH that is of the UE and that is in a first cell, and the control module controls, according to the second RRC configuration information, physical-layer information preset in a second base station, and the PH that is of the UE and that is in the first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 6, further, if the first base station supports a TDD mode, the second RRC configuration information further includes subframe ratio information, and the control module 51 is further configured to learn, according to the subframe ratio information, whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{T \times D}(F')$, the parameter Ks, and $\beta_{offset}^{COI}$ in Embodiment 2, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD–FDD joint operation if RRC of a TDD eNB (the first base station) and RRC of an FDD eNodeB (the second base station) are independent from each other.

The first base station sends the first RRC configuration information to the UE; the UE calculates, according to the first RRC configuration information and the preset physical-layer information, a PH that exists when the UE previously performs uplink transmission in the first cell, and sends the PH and the second RRC configuration information to the second base station; and the receiving module 50 receives the second RRC configuration information and the PH that is of the UE and that is in the first cell, and the control module 51 can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the control module 51 learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the control module 51 learns of, according to the subframe ratio information, that the UE performs transmission at a next moment in an uplink subframe, the control module 51 may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the base station provided in this embodiment of the present invention, the receiving module receives second RRC configuration information sent by UE, and the control module learns of, according to subframe ratio information in the second RRC configuration information, whether a subframe in which the UE performs transmission at a next moment is an uplink subframe or a downlink subframe, so that the control module can better control, according to the second RRC configuration information, physical-layer information preset in a second base station, and a PH that is of the UE and that is in a first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 6, further, the second RRC configuration information includes semi-persistent scheduling configuration information, and the control module 51 is further configured to learn of, according to the semi-persistent scheduling configuration information, a location of a subframe in which the UE is semi-persistently scheduled by the first base station.

Specifically, the UE sends the second RRC configuration information and the PH that is of the UE and that is in the first cell to the second base station, where the RRC configuration information not only includes $P_{O\_PUSCH,c}(j)$, $\alpha_c(j)$, $P_{O\_PUCCH}$, $\Delta_{T \times D}(F')$, the parameter Ks, and $\beta_{offset}^{COI}$ in Embodiment 1, but also includes the semi-persistent scheduling configuration information. The receiving module 50 receives the second RRC configuration information and the PH that is of the UE and that is in the first cell, and the control module 51 may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the control module 51 learns of, according to the semi-persistent scheduling configuration information, that the UE performs transmission at a next moment in the semi-persistent scheduling subframe, the control module 51 may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the control module 51 can accurately estimate an RB scheduling status that is of the UE at a next moment and that is in the second cell controlled by the second base station, to control transmit power that is of the UE at a next moment and that is in the second cell. If the control module 51 learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the base station provided in this embodiment of the present invention, the receiving module receives second RRC configuration information sent by UE, and the control module learns of, according to semi-persistent scheduling configuration information in the second RRC configuration information, whether a subframe in which the UE performs transmission at a next moment is a semi-persistent scheduling subframe or a non-semi-persistent scheduling subframe, so that the control module can better control, according to the second RRC configuration information, physical-layer information preset in a second base station, and a PH that is of the UE and that is in a first cell, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 7:
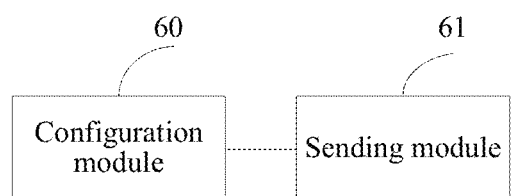
FIG. 7 is a schematic structural diagram of Embodiment 4 of a base station according to the present invention.

FIG. 7 is a schematic structural diagram of Embodiment 4 of a base station according to the present invention. The base station is a first base station, and as shown in FIG. 7, the base station includes: a configuration module 60 and a sending module 61. The configuration module 60 is configured to perform configuration on first RRC configuration information for UE, where the first RRC configuration information includes a parameter used to calculate a PH that is of the UE and that is in a first cell controlled by the first base station; and the sending module 61 is configured to send the first RRC configuration information to the UE, so that the UE sends second RRC configuration information to a second base station, where the second RRC configuration information includes the parameter used to calculate the PH that is of the UE and that is in the first cell.

This embodiment of the present invention is applicable to a scenario of dual connectivity, and two base stations in the scenario of dual connectivity use independent RRC, that is, UE of each base station is separately configured by RRC of the base station.

Specifically, the configuration module 60 configures the first RRC configuration information for the UE, and the first RRC configuration information is higher-layer configuration information, and includes the parameter used by the UE and the second base station to calculate the PH that is of the UE and that is in the first cell covered by the first base station. The first RRC configuration information may include: $P_{O\_PUSCH,c}(j)$, $\alpha_c(j)$, $P_{O\_PUCCH}$, $\Delta_{TxD}(F')$, a parameter Ks, and $\beta_{offset}^{COI}$. $P_{O\_PUSCH,c}(j)$ is used to set a power offset of a PUSCH in different scheduling manners (j), $\alpha_c(j)$ is used to calculate a path loss compensation coefficient in different scheduling manners (j), $P_{O\_PUCCH}$ is used to set a power offset of a PUCCH, $\Delta_{TxD}(F')$ is used to set a parameter related to a PUCCH format, and the parameter Ks and $\beta_{offset}^{COI}$ are used to calculate a transmission format compensation value $\Delta_{TF,c}(i)$.

The sending module 61 sends the first RRC configuration information to the UE, the UE may calculate, according to these parameters in the first RRC configuration information with reference to physical-layer information preset in the UE, the PH that is of the UE and that is in the first cell controlled by the first base station, and the UE may further learn of, according to the preset physical-layer information, a quantity of RBs (that is, a quantity of uplink resources) scheduled previously by the first base station for the UE to perform uplink transmission in the first cell. For that the UE determines, according to the first RRC configuration information and the preset physical-layer information, a PH that exists when the UE previously performs uplink transmission in the first cell, refer to the description in Embodiment 1, and details are not described herein again.

With reference to different cases in which the UE sends a PUSCH or a PUCCH, a corresponding formula of Formula 1 to Formula 7 is selected. The UE may calculate, according to a parameter included in the first RRC configuration information and content included in the physical-layer information preset in the UE, the PH that is of the UE and that is in the first cell controlled by the first base station, and send the PH to the second base station. Optionally, the PH may be sent to the second base station in a form of a PHR. Moreover, the UE further sends the second RRC configuration information to the second base station, and the second RRC configuration information also includes the parameter used to calculate the PH that is of the UE and that is in the first cell. Herein, it should be noted that, although the UE may send the PH that is of the UE and that is in the first cell to the second base station, when the first base station reconfigures for the UE a parameter used to calculate the PH that is of the UE and that is in the first cell, the second base station may directly calculate the new PH by using these parameters and the physical-layer information preset in the second base station, and the UE no longer needs to calculate the PH. Moreover, the physical-layer information preset in the second base station is the same as the physical-layer information preset in the UE, and may be forwarded by the UE or may be directly sent by the first base station to the second base station during ideal backhaul, that is, the physical-layer information preset in the second base station herein may be configured by the first base station (certainly, the second base station further has other physical-layer information that is configured by the second base station itself).

The second base station learns of, according to the second RRC configuration information, the physical-layer information preset in the second base station, and the PH that is of the UE and that is in the first cell, physical-layer information such as a quantity of RBs scheduled by the first base station for the UE when the UE previously performs uplink transmission in the first cell, a scheduling grant manner, and transmission format information; and the second base station and the UE calculate a parameter related to the PH corresponding to the first base station, so that a power use status existing when the UE previously performs uplink transmission in the first cell can be known. It should be noted that, the PH in the first cell refers to a previous power headroom that is of the UE and that is in the first cell, and the parameter, included in the second RRC configuration information, for calculating the PH that is of the UE and that is in the first cell is also configured by the first base station. Meanwhile, the second base station further learns of, according to RRC configuration information configured by the second base station for the UE, physical-layer information configured by the second base station for the UE, and a PHR of the second base station, a power headroom and a quantity of RBs scheduled by the second base station for the UE when the UE previously performs uplink transmission in the second cell controlled by the second base station. That is, the second base station can learn of a power use status existing when the UE previously performs uplink transmission in the second cell. Finally, with reference to previous power use statuses that are of the UE and that are in the first cell and the second cell, the second base station controls the transmit power existing when the UE performs uplink transmission in the second cell at a next time, so that total transmit power of the UE (the total transmit power of the UE is equal to a sum of transmit power that is of the UE and that are in all cells) does not exceed allowable maximum transmit power of the UE.

It should be noted that after the UE receives the first RRC configuration information sent by the first base station, the UE further sends the second RRC configuration information to the second base station, where the second RRC configuration information also includes the parameter used to calculate the PH in the first cell. In this way, the second base station can learn of a specific process of calculating a PH existing when the UE previously performs uplink transmission in the first cell, and moreover, when the first base station reconfigures for the UE a parameter in the first RRC configuration information, the UE adds the new parameter to the second RRC configuration information and sends the new parameter to the second base station, to avoid that in a case in which the parameter in the first RRC configuration information of the first base station already changes, the second base station still uses the original parameter to learn of a specific process of calculating the PH that is of the UE and that is in the first cell, because the PH of the first cell may already change in this case. Optionally, the first RRC configuration information and the second RRC configuration information may be the same or may be different, but both include the parameter used to calculate the previous PH that is of the UE and that is in the first cell.

According to the base station provided in this embodiment of the present invention, the configuration module configures first RRC configuration information for UE, and the sending module sends the first RRC configuration information to the UE, so that the UE may acquire, according to the first RRC configuration information and physical-layer information preset in the UE, a PH that is of the UE and that is in a first cell controlled by a first base station, and the UE sends second RRC configuration information to a second base station, so that the second base station may control, according to the second RRC configuration information, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 7, the second RRC configuration information is used by the second base station to control transmit power that is of the UE and that is in the second cell controlled by the second base station. Further, if the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Specifically, in this embodiment, the second RRC configuration information may include $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 2, and further includes the subframe ratio information. The subframe ratio information may also be configured by the first base station for the UE. In a scenario of dual connectivity, the UE is separately connected to the first base station and the second base station that provide a service to the UE, where the first base station supports a TDD mode, and the second base station supports an FDD mode. That cells of TDD and FDD provide a service to the UE is also referred to as TDD+FDD carrier aggregation or a TDD-FDD joint operation if RRC of a TDD eNB (the first base station) and RRC of an FDD eNodeB (the second base station) are independent from each other.

The sending module 61 sends the first RRC configuration information to the UE; the UE calculates, according to the first RRC configuration information and the physical-layer information preset in the UE, a PH that exists when the UE previously performs uplink transmission in the first cell, and the UE sends the PH to the second base station and sends the second RRC configuration information to the second base station; and the second base station can learn of, according to the second RRC configuration information, a specific parameter used to calculate the PH in the first cell, and can further learn, according to the subframe ratio information in the second RRC configuration information, which subframes in a TDD cell (the first cell) are used for an uplink and which subframes in a TDD cell (the first cell) are used for a downlink.

For example, if the second base station learns of, according to the subframe ratio information, that the UE performs transmission at a next moment in a downlink subframe, in the downlink subframe of the TDD cell (the first cell), the UE is definitely not scheduled for uplink transmission, all transmit power of the UE may be used for scheduling in the FDD cell (the second cell), and power use that is of the UE and that is in the TDD cell does not need to be considered, that is, the second base station can schedule many RBs as long as the transmit power that is of the UE and that is in the second cell does not exceed allowable maximum transmit power of the UE. If the second base station learns of, according to the subframe ratio information, that the UE performs transmission at a next moment in an uplink subframe, the second base station may control transmit power that is of the UE and that is in the second cell with reference to the technical solution in Embodiment 1, and details are not described herein again.

It should be noted that, in this embodiment, the second cell is not limited to an FDD cell, and may also be a TDD cell, and in this case, the UE may report subframe ratio information of any TDD cell to another cell.

According to the base station provided in this embodiment of the present invention, the configuration module configures first RRC configuration information for UE, and the sending module sends the first RRC configuration information to the UE, so that the UE may acquire, according to the first RRC configuration information and physical-layer information preset in the UE, a PH that is of the UE and that is in a first cell controlled by a first base station, and the UE sends second RRC configuration information to a second base station, so that the second base station can learn, according to subframe ratio information in the second RRC configuration information, whether a subframe in which the UE performs transmission at a next moment is an uplink subframe or a downlink subframe, and can more accurately control transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Based on the embodiment shown in FIG. 7, further, the second RRC configuration information includes semi-persistent scheduling configuration information, and the subframe ratio information is used by the second base station to learn of a location of a subframe in which the UE is semi-persistently scheduled by the first base station.

Specifically, the second RRC configuration information not only includes $P_{O\_PUSCH,c}(j)$, $\alpha_c(j)$, $P_{O\_PUCCH}$, $\Delta_{TxD}(F')$, the parameter Ks, and $\beta_{offset}^{COI}$ in Embodiment 2, but also includes the semi-persistent scheduling configuration information. The second base station may learn of, according to the second RRC configuration information, a specific parameter used to calculate the PH in the first cell, and may further learn of, according to the semi-persistent scheduling configuration information in the second RRC configuration information, the location of the subframe in which the UE is semi-persistently scheduled by the first base station. In the semi-persistent scheduling subframe, physical-layer information configured by the configuration module 60 of the first base station for the UE is constant, for example: in the semi-persistent scheduling subframe, a quantity of RBs scheduled by the first base station for the UE to perform uplink transmission in the first cell is constant (where RB scheduling in Embodiment 1 is dynamic scheduling, and a quantity of RBs scheduled by the first base station for the UE to perform uplink transmission each time may be different).

If the second base station learns of, according to the semi-persistent scheduling configuration information, that the UE performs transmission at a next moment in the semi-persistent scheduling subframe, the second base station may learn of, according to physical-layer information that is preset by the UE previously and that is in the semi-persistent scheduling subframe, an RB scheduling status that is of the UE at a next moment and that is in the first cell controlled by the first base station (a quantity of RBs scheduled by the first base station in each semi-persistent scheduling subframe is constant), so that the second base station can accurately estimate an RB scheduling status that is of the UE at a next moment and that is in the second cell controlled by the second base station, to control transmit power that is of the UE at a next moment and that is in the second cell. If the second base station learns of, according to the semi-persistent scheduling configuration information, that the UE performs transmission at a next moment in a non-semi-persistent scheduling subframe (that is, the UE is dynamically scheduled in the subframe by the first base station), the second base station controls, with reference to the technical solution in Embodiment 1, transmit power that is of the UE at a next moment and that is in the second cell, and details are not described herein again.

It should be noted that, in this embodiment, a duplex mode of the first cell and the second cell is not limited. Moreover, when both the first base station and the second base station configure the semi-persistent scheduling configuration information for the UE, the UE may report the semi-persistent scheduling configuration information of either cell to the other cell.

According to the base station provided in this embodiment of the present invention, the configuration module configures first RRC configuration information for UE, and the sending module sends the first RRC configuration information to the UE, so that the UE may acquire, according to the first RRC configuration information and physical-layer information preset in the UE, a PH that is of the UE and that is in a first cell controlled by a first base station, the UE sends second RRC configuration information to a second base station, where the second RRC configuration information includes a parameter used to calculate a PH that is of the UE and that is in the first cell and semi-persistent scheduling configuration information configured by the first base station for the UE, so that the second base station learns of, according to the semi-persistent scheduling configuration information in the second RRC configuration information, whether a subframe in which the UE performs transmission at a next moment is a semi-persistent scheduling subframe or a non-semi-persistent scheduling subframe, and the second base station can better control, according to the second RRC configuration information, transmit power that exists when the UE performs at a next moment uplink transmission in a second cell controlled by the second base station. The base station provided in this embodiment of the present invention is applicable to a scenario in which both RRC functions of two cells are controlled by means of RRC of one base station, and moreover, when two base stations use independent RRC, transmit power of the UE can also be effectively controlled, thereby improving uplink power control compatibility.

Figure 8:
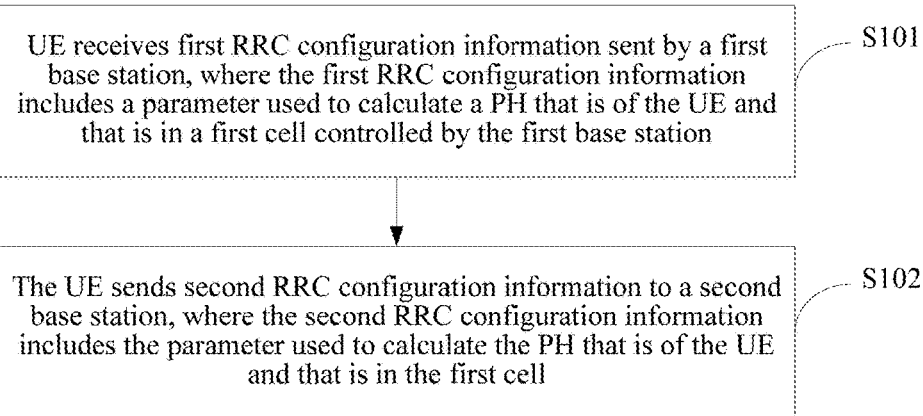
FIG. 8 is a schematic flowchart of Embodiment 1 of an uplink power control method according to the present invention.

FIG. 8 is a schematic flowchart of Embodiment 1 of an uplink power control method according to the present invention. This method may be executed by the user equipment in the foregoing embodiments. As shown in FIG. 8, the method includes:

S101: UE receives first RRC configuration information sent by a first base station, where the first RRC configuration information includes a parameter used to calculate a PH that is of the UE and that is in a first cell controlled by the first base station.

S102: The UE sends second RRC configuration information to a second base station, where the second RRC configuration information includes the parameter used to calculate the PH that is of the UE and that is in the first cell.

For a process of executing the uplink power control method provided in this embodiment of the present invention, refer to the embodiment of the user equipment, the implementation principles and the technical solutions thereof are similar, and details are not described herein again.

Further, the second RRC configuration information is used by the second base station to control transmit power that is of the UE and that is in a second cell controlled by the second base station.

Optionally, if the first base station supports a TDD mode, the second RRC configuration information may further include subframe ratio information, where the subframe ratio information is used by the second base station to learn whether a subframe in which the UE is scheduled by the first base station at a next moment is an uplink subframe or a downlink subframe.

Optionally, the second RRC configuration information further includes semi-persistent scheduling configuration information, where the semi-persistent scheduling configuration information is used by the second base station to learn of a location of a subframe in which the UE is semi-persistently scheduled by the first base station.

For a process of executing the uplink power control method provided in this embodiment of the present invention, refer to the embodiment of the user equipment, the implementation principles and the technical solutions thereof are similar, and details are not described herein again.

Figure 9:
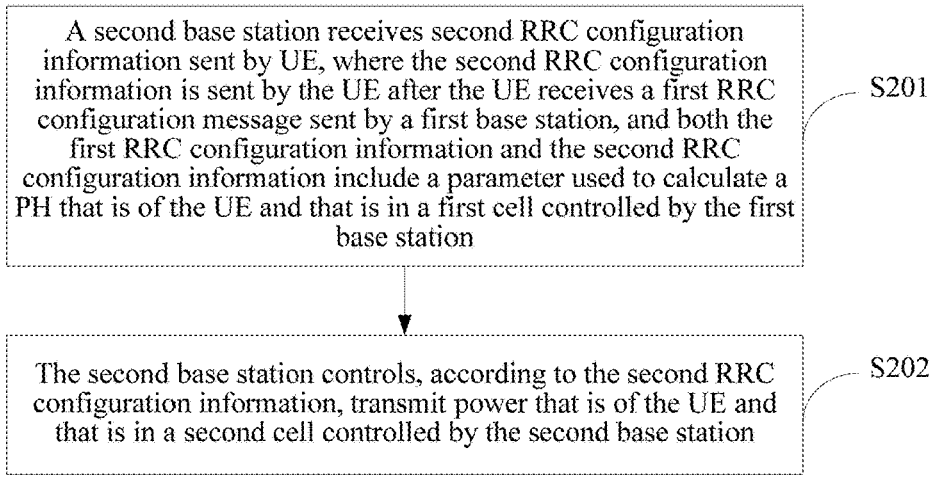
FIG. 9 is a schematic flowchart of Embodiment 2 of an uplink power control method according to the present invention.

FIG. 9 is a schematic flowchart of Embodiment 2 of an uplink power control method according to the present invention. This method may be executed by the second base station in the foregoing embodiments. As shown in FIG. 9, the method includes:

S201: A second base station receives second RRC configuration information sent by UE, where the second RRC configuration information is sent by the UE after the UE receives a first RRC configuration message sent by a first base station, and both the first RRC configuration information and the second RRC configuration information include a parameter used to calculate a PH that is of the UE and that is in a first cell controlled by the first base station.

S202: The second base station controls, according to the second RRC configuration information, transmit power that is of the UE and that is in a second cell controlled by the second base station.

For a process of executing the uplink power control method provided in this embodiment of the present invention, refer to the embodiment of the second base station, the implementation principles and the technical solutions thereof are similar, and details are not described herein again.

Optionally, if the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Optionally, the second RRC configuration information further includes semi-persistent scheduling configuration information, so that the second base station learns of, according to the semi-persistent scheduling configuration information, a location of a subframe in which the UE is semi-persistently scheduled by the first base station.

For a process of executing the uplink power control method provided in this embodiment of the present invention, refer to the embodiment of the second base station, the implementation principles and the technical solutions thereof are similar, and details are not described herein again.

Figure 10:
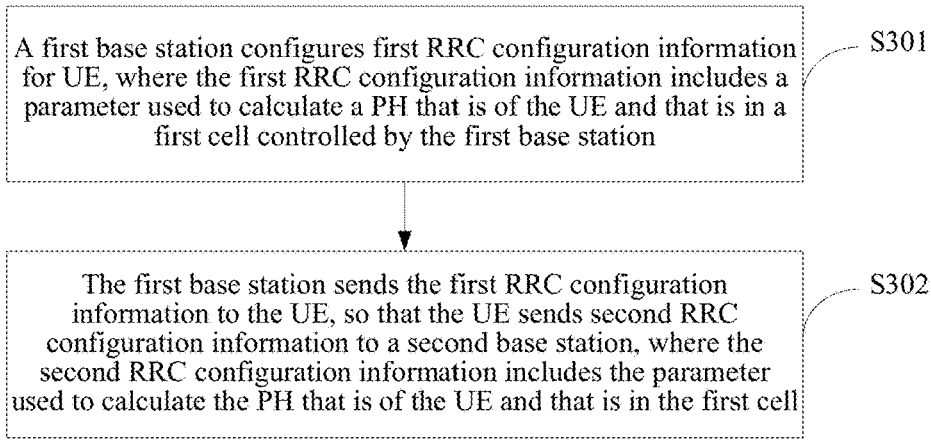
FIG. 10 is a schematic flowchart of Embodiment 3 of an uplink power control method according to the present invention.

FIG. 10 is a schematic flowchart of Embodiment 3 of an uplink power control method according to the present invention. This method is executed by the first base station in the foregoing embodiments. As shown in FIG. 10, the method includes:

S301: A first base station configures first RRC configuration information for UE, where the first RRC configuration information includes a parameter used to calculate a PH that is of the UE and that is in a first cell controlled by the first base station.

S302: The first base station sends the first RRC configuration information to the UE, so that the UE sends second RRC configuration information to a second base station, where the second RRC configuration information includes the parameter used to calculate the PH that is of the UE and that is in the first cell.

For a process of executing the uplink power control method provided in this embodiment of the present invention, refer to the embodiment of the first base station, the implementation principles and the technical solutions thereof are similar, and details are not described herein again.

Further, the second RRC configuration information is used by the second base station to control transmit power that is of the UE and that is in a second cell controlled by the second base station.

Optionally, if the first base station supports a TDD mode, the second RRC configuration information further includes subframe ratio information, where the subframe ratio information is used by the second base station to learn whether a subframe in which the UE is scheduled by the first base station at a next moment is an uplink subframe or a downlink subframe.

Optionally, the second RRC configuration information further includes semi-persistent scheduling configuration information, where the semi-persistent scheduling configuration information is used by the second base station to learn of a location of a subframe in which the UE is semi-persistently scheduled by the first base station.

For a process of executing the uplink power control method provided in this embodiment of the present invention, refer to the embodiment of the first base station, the implementation principles and the technical solutions thereof are similar, and details are not described herein again.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. User equipment, comprising:
   a receiver, configured to receive first radio resource control(RRC) configuration information sent by a first base station, wherein the first RRC configuration information comprises a parameter used to calculate a power headroom PH that is of the UE and that is in a first cell controlled by the first base station; and
   a transmitter, configured to send second RRC configuration information to a second base station, wherein the second RRC configuration information comprises the parameter used to calculate the PH that is of the UE and that is in the first cell, wherein if the first base station supports a time division duplex TDD mode, the second RRC configuration information further comprises subframe ratio information, wherein the subframe ratio information is used by the second base station to learn whether a subframe in which the UE is scheduled by the first base station at a next moment is an uplink subframe or a downlink subframe.

2. The user equipment according to claim 1, wherein the second RRC configuration information is used by the second base station to control transmit power that is of the UE and that is in a second cell controlled by the second base station.

3. The user equipment according to claim 1, wherein the second RRC configuration information further comprises semi-persistent scheduling configuration information, wherein the semi-persistent scheduling configuration information is used by the second base station to learn of a location of a subframe in which the UE is semi-persistently scheduled by the first base station.

4. A base station, comprising:
a receiver, configured to receive second radio resource control(RRC) configuration information sent by user equipment UE, wherein the second RRC configuration information is sent by the UE after the UE receives a first RRC configuration message sent by a first base station, and both the first RRC configuration information and the second RRC configuration information comprise a parameter used to calculate a power headroom PH that is of the UE and that is in a first cell controlled by the first base station; and
a processor, configured to control, according to the second RRC configuration information, transmit power that is of the UE and that is in a second cell controlled by a second base station, wherein if the first base station supports a time division duplex TDD mode, the second RRC configuration information further comprises subframe ratio information, wherein the subframe ratio information is used by the second base station to learn whether a subframe in which the UE is scheduled by the first base station at a next moment is an uplink subframe or a downlink subframe.

5. The base station according to claim 4, wherein the second RRC configuration information further comprises semi-persistent scheduling configuration information, and the processor is further configured to learn of, according to the semi-persistent scheduling configuration information, a location of a subframe in which the UE is semi-persistently scheduled by the first base station.

6. A base station, comprising:
a processor, configured to perform configuration on first radio resource control (RRC) configuration information for user equipment UE, wherein the first RRC configuration information comprises a parameter used to calculate a power headroom PH that is of the UE and that is in a first cell controlled by a first base station; and
a transmitter, configured to send the first RRC configuration information to the UE, so that the UE sends second RRC configuration information to a second base station, wherein the second RRC configuration information comprises the parameter used to calculate the PH that is of the UE and that is in the first cell, wherein if the first base station supports a time division duplex TDD mode, the second RRC configuration information further comprises subframe ratio information, wherein the subframe ratio information is used by the second base station to learn whether a subframe in which the UE is scheduled by the first base station at a next moment is an uplink subframe or a downlink subframe.

7. The base station according to claim 6, wherein the second RRC configuration information is used by the second base station to control transmit power that is of the UE and that is in a second cell controlled by the second base station.

8. The base station according to claim 6, wherein the second RRC configuration information further comprises semi-persistent scheduling configuration information, wherein the semi-persistent scheduling configuration information is used by the second base station to learn of a location of a subframe in which the UE is semi-persistently scheduled by the first base station.

9. User equipment, comprising:
a receiving module, configured to receive first radio resource control(RRC) configuration information sent by a first base station, wherein the first RRC configuration information comprises a parameter used to calculate a power headroom PH that is of the UE and that is in a first cell controlled by the first base station; and
a sending module, configured to send second RRC configuration information to a second base station, wherein the second RRC configuration information comprises the parameter used to calculate the PH that is of the UE and that is in the first cell, wherein if the first base station supports a time division duplex TDD mode, the second RRC configuration information further comprises subframe ratio information, wherein the subframe ratio information is used by the second base station to learn whether a subframe in which the UE is scheduled by the first base station at a next moment is an uplink subframe or a downlink subframe.

10. The user equipment according to claim 9, wherein the second RRC configuration information is used by the second base station to control transmit power that is of the UE and that is in a second cell controlled by the second base station.

11. The user equipment according to claim 9, wherein the second RRC configuration information further comprises semi-persistent scheduling configuration information, wherein the semi-persistent scheduling configuration information is used by the second base station to learn of a location of a subframe in which the UE is semi-persistently scheduled by the first base station.

12. An uplink power control method, comprising:
receiving, by user equipment UE, first radio resource control(RRC) configuration information sent by a first base station, wherein the first RRC configuration information comprises a parameter used to calculate a power headroom PH that is of the UE and that is in a first cell controlled by the first base station; and
sending, by the UE, second RRC configuration information to a second base station, wherein the second RRC configuration information comprises the parameter used to calculate the PH that is of the UE and that is in the first cell, wherein if the first base station supports a time division duplex TDD mode, the second RRC configuration information further comprises subframe ratio information, wherein the subframe ratio information is used by the second base station to learn whether a subframe in which the UE is scheduled by the first base station at a next moment is an uplink subframe or a downlink subframe.

13. The method according to claim 12, wherein the second RRC configuration information is used by the second base station to control transmit power that is of the UE and that is in a second cell controlled by the second base station.

14. The method according to claim 12, wherein the second RRC configuration information further comprises semi-persistent scheduling configuration information, wherein the semi-persistent scheduling configuration information is used by the second base station to learn of a location of a subframe in which the UE is semi-persistently scheduled by the first base station.

\* \* \* \* \*